United States Patent
Takahashi et al.

(10) Patent No.: US 9,977,532 B2
(45) Date of Patent: May 22, 2018

(54) INPUT APPARATUS, CONTROL METHOD FOR INPUT APPARATUS, APPARATUS AND PROGRAM CAUSING COMPUTER TO EXECUTE CONTROL METHOD FOR INPUT

(71) Applicant: ALPS ELECTRIC CO., LTD., Tokyo (JP)

(72) Inventors: Akihiro Takahashi, Miyagi-ken (JP); Shinichi Sagawai, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 76 days.

(21) Appl. No.: 15/093,527

(22) Filed: Apr. 7, 2016

(65) Prior Publication Data
US 2016/0342264 A1 Nov. 24, 2016

(30) Foreign Application Priority Data
May 18, 2015 (JP) .................................. 2015-100996

(51) Int. Cl.
*G06F 3/045* (2006.01)
*G06F 3/041* (2006.01)

(52) U.S. Cl.
CPC .. *G06F 3/0416* (2013.01); *G06F 2203/04108* (2013.01)

(58) Field of Classification Search
CPC .................... G06G 3/0416; G06F 2203/04108
USPC ....................................................... 345/174
See application file for complete search history.

(56) References Cited

U.S. PATENT DOCUMENTS

| | | | |
|---|---|---|---|
| 9,645,677 B2 | 5/2017 | Sagawai et al. | |
| 2010/0060591 A1 | 3/2010 | Yousefpor et al. | |
| 2010/0244859 A1 | 9/2010 | Cormier, Jr. et al. | |
| 2011/0043478 A1 | 2/2011 | Matsushima | |
| 2011/0055305 A1 | 3/2011 | Matsushima et al. | |
| 2011/0061948 A1 | 3/2011 | Krah et al. | |
| 2011/0063154 A1 | 3/2011 | Hotelling et al. | |
| 2012/0146940 A1* | 6/2012 | Yamamoto | G06F 3/044 345/174 |
| 2013/0021294 A1 | 1/2013 | Maharyta et al. | |
| 2014/0035874 A1 | 2/2014 | Iizuka | |
| 2014/0104236 A1 | 4/2014 | Hamaguchi et al. | |

(Continued)

FOREIGN PATENT DOCUMENTS

WO WO 2009/107415 9/2009

*Primary Examiner* — Kumar Patel
*Assistant Examiner* — Kuo Woo
(74) *Attorney, Agent, or Firm* — Beyer Law Group LLP (57) ABSTRACT

An input apparatus includes a sensor section configured to include a plurality of detection units, and to control positive and negative polarities of a detection signal at each detection position, a control unit configured to generate a group of combined detection signals in which polarity patterns are different from each other, and a signal reproduction unit configured to reproduce signal levels of a group of detection signals on the basis of a group of combined detection signals and a group of polarity patterns, in which at least some of the plurality of detection units differ in the number of detection positions, and the control unit selects the group of polarity patterns according to the number of detection positions so that the number of positive polarities and the number of negative polarities included in each of the polarity patterns are similar to each other.

12 Claims, 4 Drawing Sheets

(56) References Cited

U.S. PATENT DOCUMENTS

2015/0268758 A1 9/2015 Lo et al.
2016/0041645 A1 2/2016 Ray et al.

* cited by examiner

INPUT APPARATUS, CONTROL METHOD FOR INPUT APPARATUS, APPARATUS AND PROGRAM CAUSING COMPUTER TO EXECUTE CONTROL METHOD FOR INPUT

CLAIM OF PRIORITY

This application claims benefit of Japanese Patent Application No. 2015-100996 filed on May 18, 2015, which is hereby incorporated by reference.

BACKGROUND OF THE INVENTION

1. Field of the Invention

The present invention relates to an input apparatus, a control method for the input apparatus, and a program causing a computer to execute the control method for the input apparatus.

2. Description of the Related Art

There is an input apparatus which detects a proximity state of an operation body such as a finger by measuring a physical quantity such as electrostatic capacitance at a plurality of detection positions in a detection region. An input apparatus as an example includes a plurality of driving electrodes which are disposed in a certain layer and are parallel to each other, and a plurality of detection electrodes which are disposed in another layer and are parallel to each other, and an intersection position between a driving electrode and a detection electrode is a detection position.

As a driving method for acquiring an electrostatic capacitance at a detection position, there is encoding driving. In encoding driving, for example, a plurality of operations are repeatedly performed in which driving signals with one of positive and negative polarities are simultaneously applied to a plurality of driving electrodes, and detection signals are also measured by the detection electrodes. An electrostatic capacitance at a detection position is calculated on the basis of the obtained detection signal and the driving signal.

International Publication No. WO2009/107415 is an example of the related art.

Generally, a plurality of driving electrodes are arranged at equal intervals, and detection electrodes are also arranged at equal intervals. Thus, if a detection region is rectangular, any number of detection electrodes is associated with the same number of detection positions. On the other hand, a detection region may be desired to have various shapes other than a rectangular shape. If the detection region has a shape other than a rectangular shape, the number of associated detection positions may differ between detection electrodes. In this case, in encoding driving of an input apparatus of the related art, the same driving signal pattern is used for all detection electrodes regardless of the number of detection positions.

If the same driving signal pattern as that of detection electrodes with a large number of detection positions is used for detection electrodes with a small number of detection positions, the balance between positive and negative polarities of a detection signal collapses, and thus levels of detection signals of the detection electrodes with a small number of detection positions increase. In other words, if the number of positive detection signals is larger than the number of negative detection signals, a signal obtained by combining the signals tends to have a signal level which is higher in the positive polarity. If the number of negative detection signals is larger than the number of positive detection signals, a signal obtained by combining the signals tends to have a signal level which is higher in the negative polarity. If a dynamic range is adjusted with respect to a detection electrode having a higher signal level, there is a disadvantage in that the sensitivity of a detection electrode with a lower signal level is reduced. If the level of the detection signal increases, there is also a disadvantage in that noise increases.

SUMMARY OF THE INVENTION

The present invention provides an input apparatus, a control method for the input apparatus, and a program causing a computer to execute the control method for the input apparatus, capable of improving a degree of freedom of a shape of a detection region and also realizing high sensitivity.

According to an aspect of the present invention, there is provided an input apparatus inputting information according to a proximity state of an object at a plurality of detection positions, the apparatus including a sensor section configured to include a plurality of detection units each detecting a proximity state of an object at a group of the detection positions and each generating a combined detection signal corresponding to a sum of a group of detection signals obtained as a result of the detection at the group of detection positions, and to control positive and negative polarities of the detection signal with a signal level corresponding to the proximity state at each of the detection positions; a control unit configured to control the sensor section so that each of the plurality of detection units generates a group of combined detection signals formed of the combined detection signals in which polarity patterns which are a group of polarities set for the group of detection signals are different from each other and formed of the same number of combined detection signals as the number of detection signals in a group; and a signal reproduction unit configured to reproduce signal levels of the group of detection signals which are sources of the combined detection signal on the basis of the group of combined detection signals generated by the detection unit and a group of polarity patterns used for generation of the group of combined detection signals. At least some of the plurality of detection units differ in the number of detection positions in a group. The control unit selects the group of polarity patterns used for generation of the group of combined detection signals in a single detection unit according to the number of detection positions in a group so that the number of positive polarities and the number of negative polarities included in each of the polarity patterns are similar to each other.

With this configuration, since there are provided a plurality of detection units in which the number of detection positions included in a group of detection positions differs, a detection region in which the detection positions are distributed can be easily made to have arbitrary shapes, and thus it is possible to improve a degree of freedom of a shape of the detection region.

A group of polarity patterns used for generation of a group of combined detection signals in a single detection unit is selected so that the number of positive polarities and the number of negative polarities included in each polarity pattern are similar to each other according to the number of detection positions in a group included in the single detection unit. Consequently, since a difference between the number of positive detection signals and the number of negative detection signals which are sources of the combined detection signal is reduced in each of the plurality of detection units, a signal level of the combined detection signal can be reduced more than in a case where a balance of the number of detection signals is biased to one polarity.

If the signal level of the combined detection signal is reduced, a sufficient dynamic range for the combined detection signal can be secured in the signal reproduction unit to which the combined detection signal is input. Therefore, a minute detection signal obtained in each detection element can be reproduced with high sensitivity.

In the input apparatus according to the aspect of the present invention, preferably, in a case where the number of detection positions in a group in a single detection unit is N, the positive polarity or the negative polarity set to a detection signal is indicated by "1" or "−1", the polarity pattern set to a group of detection signals formed of N detection signals is expressed by a partial matrix of one row and N columns having elements of "1" or "−1", and the group of the polarity patterns formed of N polarity patterns is expressed by a matrix of N rows and N columns formed of N partial matrices, the signal reproduction unit reproduces signal levels of the group of detection signals which are sources of the combined detection signal by performing calculation of a product of an inverse matrix of the matrix of N rows and N columns, and a matrix of N rows and one column having the group of combined detection signals generated by the single detection unit as elements.

In the input apparatus according to the aspect of the present invention, preferably, the control unit uses, as the matrix of N rows and N columns, a matrix generated by excluding a row and a column in which total values of elements in a row direction and a column direction are the maximum from a Hadamard matrix whose number of rows and number of columns exceed N, the Hadamard matrix being generated according to a Bailey method.

With this configuration, the numbers of positive and negative polarities of driving signals which are simultaneously applied to the driving electrodes are similar to each other at a group of detection positions, and thus radiation noise from the driving electrodes is reduced.

In the input apparatus according to the aspect of the present invention, preferably, the signal reproduction unit performs a first signal reproduction process of reproducing signal levels of the group of detection signals which are sources of the combined detection signal through calculation of a product of the inverse matrix and the matrix of N rows and one column; a second signal reproduction process of reproducing signal levels of the group of detection signals which are sources of the combined detection signal through calculation of a product of an extended inverse matrix which is a matrix obtained by replacing an element of "0" in the inverse matrix with a value having a polarity opposite to a polarity of an element which is not "0", and the matrix of N rows and one column; an offset calculation process of calculating, as an offset, an average value of differences between the signal levels of the group of the detection signals reproduced in the first signal reproduction process and the signal levels of the group of the detection signals reproduced in the second signal reproduction process; and an offset adding process of adding the offset to each of the signal levels of the group of the detection signals reproduced in the second signal reproduction process.

With this configuration, a signal level is calculated by using a larger number of detection signals than in a case of using the inverse matrix which is not changed, due to use of the extended inverse matrix, and thus a noise reduction effect is improved. In addition, by using the offset, a difference from a signal level calculated by using the inverse matrix is reduced while the noise reduction effect achieved by using the extended inverse matrix is maintained.

In the input apparatus according to the aspect of the present invention, preferably, the sensor section further includes a plurality of detection elements configured to be disposed so as to correspond to the plurality of detection positions and to generate the detection signal, the detection signal having a signal level corresponding to a proximity state of an object, and the positive polarity or the negative polarity being set to the detection signal according to an input driving signal; and a driving unit configured to supply the driving signal to each of the plurality of detection elements under the control of the control unit. In addition, preferably, the detection unit includes a group of the detection elements corresponding to a group of the detection positions, and generates the combined detection signal corresponding to a sum of the group of the detection signals output from the group of the detection elements.

In the input apparatus according to the aspect of the present invention, preferably, the sensor section further includes a plurality of detection electrodes; a plurality of driving electrodes configured to intersect the plurality of detection electrodes; and a combined detection signal generation unit. In addition, preferably, the detection element is a capacitor formed at an intersection between a detection electrode and a driving electrode, and the driving unit supplies the driving signal to each of the plurality of driving electrodes. Further, preferably, a group of the capacitors as a group of detection elements is formed between a single detection electrode and the plurality of driving electrodes, and the combined detection signal generation unit generates a combined detection signal corresponding to a sum of the group of the detection signals for each of the plurality of detection electrodes, the group of the detection signals indicating electrostatic capacitances of the group of the capacitors by using one of the positive polarity and the negative polarity.

In the input apparatus according to the aspect of the present invention, preferably, the number of driving electrodes intersecting a detection electrode is a prime number.

With this configuration, a group of polarity patterns matching the number of detection positions is reliably derived from the Hadamard matrix generated by using the Bailey method.

According to another aspect of the present invention, there is provided a control method for an input apparatus inputting information according to a proximity state of an object at a plurality of detection positions, the apparatus including a sensor section configured to include a plurality of detection units each detecting a proximity state of an object at a group of the detection positions and each generating a combined detection signal corresponding to a sum of a group of detection signals obtained as a result of the detection at the group of the detection positions, and to control positive and negative polarities of the detection signal with a signal level corresponding to the proximity state at each of the detection positions, and at least some of the plurality of detection units differing in the number of detection positions in a group, the method including a first step of controlling the sensor section so that each of the plurality of detection units generates a group of combined detection signals formed of the combined detection signals in which polarity patterns which are a group of the polarities set for the group of detection signals are different from each other and formed of the same number of combined detection signals the same as the number of detection signals in a group; and a second step of reproducing signal levels of the group of detection signals which are sources of the combined detection signal on the basis of the group of combined detection signals generated by the detection unit and a group of polarity patterns used for generation of the group of combined detection signals. In the first step, the group of polarity patterns used for generation of the group of combined detection signals in a single detection unit is selected according to the number of detection positions in a group so that the number of positive polarities and the number of negative polarities included in each of the polarity patterns are similar to each other.

According to still another aspect of the present invention, there is provided a program causing a computer to execute a control method for an input apparatus inputting information according to a proximity state of an object at a plurality of detection positions, the apparatus including a sensor section configured to include a plurality of detection units each detecting a proximity state of an object at a group of the detection positions and each generating a combined detection signal corresponding to a sum of a group of detection signals obtained as a result of the detection at the group of the detection positions, and to control positive and negative polarities of the detection signal with a signal level corresponding to the proximity state at each of the detection positions, and at least some of the plurality of detection units differing in the number of detection positions in a group, the method including a first step of controlling the sensor section so that each of the plurality of detection units generates a group of combined detection signals formed of the combined detection signals in which polarity patterns which are a group of the polarities set for the group of detection signals are different from each other and formed of the same number of combined detection signals as the number of detection signals in a group; and a second step of reproducing signal levels of the group of detection signals which are sources of the combined detection signal on the basis of the group of combined detection signals generated by the detection unit and a group of polarity patterns used for generation of the group of combined detection signals. In the first step, the group of polarity patterns used for generation of the group of combined detection signals in a single detection unit is selected according to the number of detection positions in a group so that the number of positive polarities and the number of negative polarities included in each of the polarity patterns are similar to each other.

DESCRIPTION OF THE PREFERRED EMBODIMENTS

Figure 1:
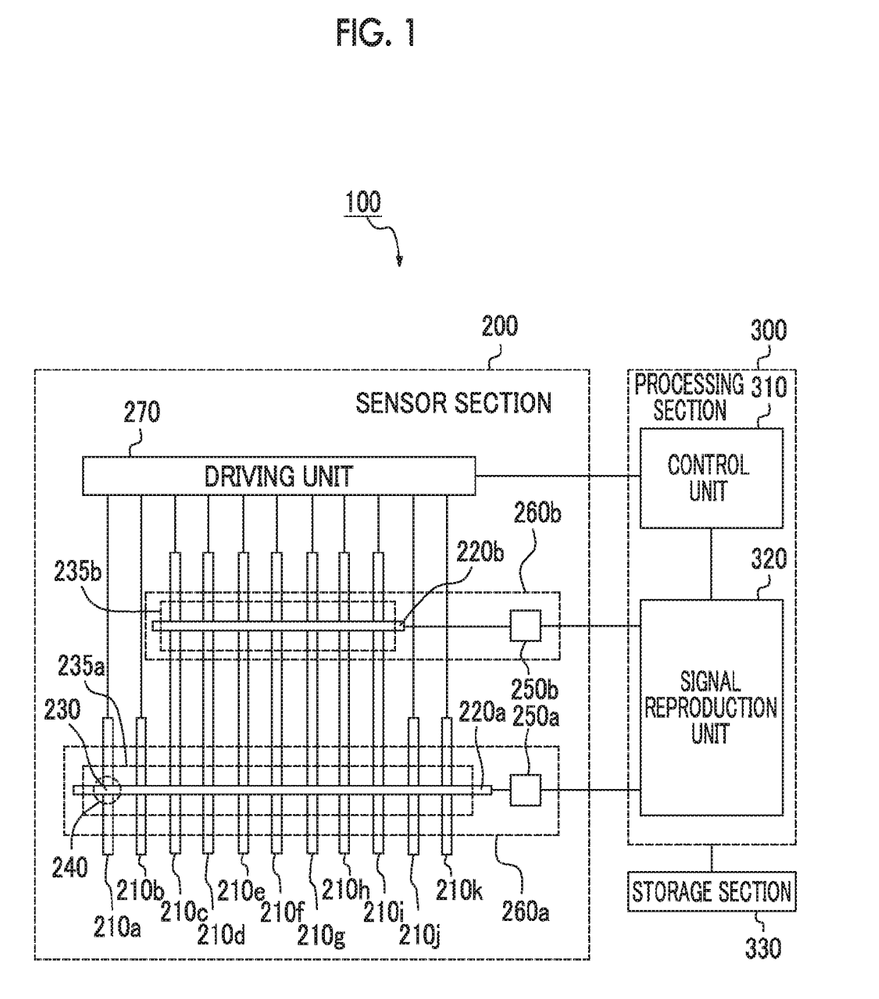
FIG. 1 is a configuration diagram of an input apparatus according to an embodiment of the present invention.

Hereinafter, a description will be made of an input apparatus which inputs information corresponding to a proximity state of an object at a plurality of detection positions. As illustrated in FIG. 1, an input apparatus 100 of the present embodiment includes a sensor section 200, a processing section 300, and a storage section 330.

The sensor section 200 is a device which detects a proximity state of an object, and includes a plurality of detection units 260. A single detection unit 260 detects a proximity state of the object at a group of detection positions 235. The detection unit 260 detects a proximity state of the object for a group of detection positions 235. If a group of detection signals can be obtained as a result of the detection, the detection unit 260 generates a combined detection signal corresponding to a sum of the group of detection signals. The detection signals obtained at the respective detection positions 235 have signal levels corresponding to the proximity state of the object, and also have positive and negative polarities. The sensor section 200 can control a polarity (positive or negative) of a detection signal obtained at each detection position according to information regarding a polarity pattern supplied from a control unit 310 (which will be described later) of the processing section 300.

In the example illustrated in FIG. 1, the sensor section 200 includes a plurality of first driving electrode 210a to an eleventh driving electrode 210k (hereinafter, referred to as driving electrodes 210 without being differentiated from each other in some cases), and a first detection electrode 220a and a second detection electrode 220b (hereinafter, referred to as detection electrodes 220 without being differentiated from each other in some cases). The driving electrodes 210 are all located in the same layer, and are arranged substantially in parallel to each other. The detection electrodes 220 are all located in the same layer, and are arranged substantially in parallel to each other. The driving electrodes 210 and the detection electrodes 220 are disposed in different layers, and appear intersecting each other as illustrated in FIG. 1 when viewed from a direction orthogonal to the layers. In a case where the driving electrodes 210 and the detection electrodes 220 intersect each other in the present specification, this indicates that the driving electrodes 210 and the detection electrodes 220 are not in contact with each other and come close to each other.

A position at which a single driving electrode 210 intersects a single detection electrode 220 is the above-described detection position 230. A detection element 240 as a capacitor having the driving electrode 210 and the detection electrode 220 as constituent elements is formed at each detection position 230. In order to simplify FIG. 1, FIG. 1 illustrates the detection position 230 and the detection element 240 at only the position where the first driving electrode 210a intersects the first detection electrode 220a, but all positions where the driving electrodes 210 intersect the detection electrodes 220 are the detection positions 230, and the detection element 240 is formed at each detection position 230. Each detection element 240 generates a detection signal whose signal level changes according to a distance between the detection position 230 and an object body such as a finger. The detection signal is, specifically, electric charge accumulated in the capacitor as the detection element 240. A predetermined driving voltage is supplied between the single driving electrode 210 and the single detection electrode 220 by a driving unit 270 which will be described later, and thus an amount of electric charge (a signal level of the detection signal) accumulated in the capacitor as the detection element 240 indicates electrostatic capacitance between the single driving electrode 210 and the single detection electrode 220. A polarity (a polarity of the detection signal) of electric charge accumulated in the capacitor as the detection element 240 is controlled according to a polarity of the driving voltage supplied by the driving unit 270.

The first detection electrode 220a intersects the first driving electrode 210a to the eleventh driving electrode 210k. The second detection electrode 220b intersects the third driving electrode 210c to the ninth driving electrode 210i. The eleven detection positions 230 included in the first detection electrode 220a are referred to as a first group of detection positions 235a. The seven detection positions 230 included in the second detection electrode 220b are referred to as a second group of detection positions 235b. Each of the first group of detection positions 235a and the second group of detection positions 235b corresponds to the above-described group of detection positions 235.

The driving electrodes 210 and the detection electrodes 220 of the present embodiment are only examples, and the number, shapes, and arrangement of the driving electrodes 210 and the detection electrodes 220 are not limited to those described in the present embodiment. Detection electrodes with different numbers of detection positions 230 included in the detection electrodes 220 may be included between the plurality of detection electrodes 220. The number of detection positions 230 included in the single detection electrode 220 is a prime number. Signals may not be transmitted to some of the detection positions 230 included in the single detection electrode 220 so that the number of detection positions 230 to be used is a prime number. At least two of the plurality of detection electrodes 220 may have the same number of detection positions 230.

The sensor section 200 further includes a first combined detection signal generation unit 250a and a second combined detection signal generation unit 250b (hereinafter, referred to as combined detection signal generation units 250 without being differentiated from each other in some cases). The first combined detection signal generation unit 250a is connected to one end of the first detection electrode 220a, and generates a combined detection signal by combining detection signals on the first detection electrode 220a with each other. The combining operation in the present embodiment indicates adding detection signal with a polarity together. The second combined detection signal generation unit 250b is connected to one end of the second detection electrode 220b, and generates a combined detection signal by combining detection signals on the second detection electrode 220b with each other.

For example, each of the combined detection signal generation units 250 includes a charge amplifier which outputs a combined detection signal corresponding to a sum of electric charge (detection signals) transmitted from the respective detection elements 240 via the detection electrode 220, and an AD converter which converts the combined detection signal output from the charge amplifier into a digital signal which is then output to the processing section 300. In this case, an AD converter may be provided for each charge amplifier, and output signals from a plurality of charge amplifiers may be converted into digital signals in a single AD converter.

A plurality of detection elements 240 corresponding to a plurality of detection positions 230 included in the first detection electrode 220a and the first combined detection signal generation unit 250a are collectively referred to as a first detection unit 260a. A plurality of detection elements 240 corresponding to a plurality of detection positions 230 included in the second detection electrode 220b and the second combined detection signal generation unit 250b are collectively referred to as a second detection unit 260b. Each of the first detection unit 260a and the second detection unit 260b corresponds to the above-described detection unit 260. The sensor section 200 may include three or more detection units 260. The number of detection positions 230 included in a certain single detection unit 260 may be different from or the same as the number of detection positions 230 included in another single detection unit 260. In the present embodiment, the single combined detection signal generation unit 250 is provided for the single detection electrode 220, but a plurality of detection electrodes 220 may be connected to the single combined detection signal generation unit 250 so as to be switched by using a multiplexer.

The sensor section 200 further includes the driving unit 270. The driving unit 270 applies a driving signal to each driving electrode 210 according to a multi-driving method on the basis of a polarity pattern which is input from the control unit 310 (which will be described later) of the processing section 300. In the multi-driving method, driving signals are simultaneously applied to the plurality of driving electrodes 210. The polarity pattern is information for designating one of a positive polarity and a negative polarity as a polarity of a detection signal to be generated for each driving electrode 210. At the detection position 230 on the driving electrode 210 designated to "1", a detection signal with a positive polarity is output. At the detection position 230 on the driving electrode 210 designated to "−1", a detection signal with a negative polarity is output. For example, a polarity of a detection signal is selected depending on which one of the driving electrode 210 and the detection electrode 220 has a higher potential. Other setting methods may be used as long as a polarity of a detection signal can be set.

The processing section 300 is a central processing unit, and realizes various functions including the control unit 310 and a signal reproduction unit 320 by reading programs and data stored in the storage section 330 and executing the programs. The processing section 300 may be realized by a dedicated logic circuit such as an application specific integrated circuit (ASIC).

In the example illustrated in FIG. 1, the processing section 300 includes the control unit 310 and the signal reproduction unit 320.

The control unit 310 controls the sensor section 200 so that each of the plurality of detection units 260 generates a group of combined detection signals. The group of combined detection signals generated by each detection unit 260 includes a plurality of combined detection signals in which detection patterns (a group of polarities set for a group of detection signals which are sources of the combined detection signal) are different from each other. The number of combined detection signals constituting a group of combined detection signals is the same as the number of a group of detection signals which are sources of the combined detection signal. For example, the control unit 310 controls the sensor section 200 so that the first detection unit 260a having eleven detection positions 230 where eleven detection signals are obtained generates eleven combined detection signals in which polarity patterns are different from each other. Similarly, the control unit 310 controls the sensor section 200 so that the second detection unit 260b having seven detection positions 230 where seven detection signals are obtained generates seven combined detection signals in which polarity patterns are different from each other.

The control unit 310 selects a group of polarity patterns used for generation of a group of combined detection signals in the single detection unit 260 according to the number of detection positions in a group so that the number of positive polarities and the number of negative polarities included in each polarity pattern are similar to each other. For example, since the first detection unit 260a has eleven detection positions 230, the control unit 310 selects eleven polarity patterns (Equation 6 which will be described later) which are determined so that the number of positive polarities and the number of negative polarities included in each polarity pattern are similar to each other with respect to the number (eleven) of detection positions 230. Since the second detection unit 260b has seven detection positions 230, the control unit 310 selects seven polarity patterns (Equation 14 which will be described later) which are determined with respect to the number (seven) of detection positions 230.

The signal reproduction unit 320 reproduces signal levels of a group of detection signals which are sources of the combined detection signal on the basis of a group of combined detection signals generated by the detection unit 260 and a group of polarity patterns used for generation of the group of combined detection signals. For example, the signal reproduction unit 320 reproduces signal levels of eleven detection signals which are sources of the combined detection signal on the basis of eleven combined detection signals generated by the first detection unit 260a and eleven polarity patterns (Equation 6 which will be described later) used for generation of the eleven combined detection signals. The signal reproduction unit 320 reproduces signal levels of seven detection signals which are sources of the combined detection signal on the basis of seven combined detection signals generated by the second detection unit 260b and seven polarity patterns (Equation 14 which will be described later) used for generation of the seven combined detection signals.

The storage section 330 stores command codes of a program executed in the central processing unit (computer) of the processing section 300, variable data (a group of combined detection signals or the like generated in each detection unit 260) which is temporarily stored in a processing process in the processing section 300, and constant data (a polarity pattern supplied to the driving unit 270, an inverse matrix (which will be described later) used for reproduction of a detection signal, and the like) used for processing in the processing section 300. The storage section 330 is configured to include, for example, a RAM, and a nonvolatile memory such as a ROM or a flash memory.

Next, a polarity pattern will be described. The number of detection positions 230 constituting a group of detection positions 235 is set to N. Electrostatic capacitances of N detection positions 230 are expressed by an electrostatic capacitance matrix C of N rows and one column as in Equation 1. A subscript of an element of the electrostatic capacitance matrix C indicates an electrostatic capacitance at the detection position 230 corresponding to each element.

$$C = \begin{pmatrix} C_1 \\ \vdots \\ C_N \end{pmatrix} \quad (1)$$

N combined detection signals which are obtained through driving for N times are expressed by a combined detection signal matrix A of N rows and one column as in Equation 2. A subscript of an element of the combined detection signal matrix A indicates that each element is a combined detection signal obtained through driving in which order. The number of elements of the combined detection signal matrix A is the same as the number of elements of the electrostatic capacitance matrix C. In other words, driving is performed for the same number of times as the number of detection positions 230.

$$A = \begin{pmatrix} A_1 \\ \vdots \\ A_N \end{pmatrix} \quad (2)$$

By using a driving matrix D of N rows and N columns indicating which one of a positive polarity and a negative polarity a detection signal at each detection position 230 has, a relationship between the electrostatic capacitance matrix C and the combined detection signal matrix A is denoted as in Equation 3.

$$D \cdot C = A \quad (3)$$

Here, the driving matrix D is a partial matrix of a Hadamard matrix H which is generated according to a Bailey method. The Hadamard matrix H is a square matrix in which an element is one of 1 and −1, and respective rows are orthogonal to each other. Arbitrary two rows of the Hadamard matrix H show vectors which are perpendicular to each other, and, if a unit matrix $I_n$ of n×n is used, an n-th order Hadamard matrix H satisfies the property in Equation 4.

$$H^T \cdot H = n I_n \quad (4)$$

The Bailey method is a method of generating a (q+1)-order Hadamard matrix H for any prime number q. In the present embodiment, as the Hadamard matrix H to be used, a Hadamard matrix is selected in which the number of rows and the number of columns are larger than N and is close to N. A partial matrix obtained by excluding a row having the greatest absolute value of a sum among rows and a column having the greatest absolute value of a sum among columns from the Hadamard matrix H is the driving matrix D. In the present embodiment, since the number of detection positions 230 corresponding to a group of detection positions 235 is a prime number, the driving matrix D is created by removing one row and one column from the Hadamard matrix H which is generated according to the Bailey method.

For example, if N=11, a twelfth-order Hadamard matrix H shown in Equation 5 is used.

$$H = \begin{pmatrix}
1 & -1 & -1 & -1 & -1 & -1 & -1 & -1 & -1 & -1 & -1 & -1 \\
1 & 1 & 1 & -1 & 1 & 1 & 1 & -1 & -1 & -1 & 1 & -1 \\
1 & -1 & 1 & 1 & -1 & 1 & 1 & 1 & -1 & -1 & -1 & 1 \\
1 & 1 & -1 & 1 & 1 & -1 & 1 & 1 & 1 & -1 & -1 & -1 \\
1 & -1 & 1 & -1 & 1 & 1 & -1 & 1 & 1 & 1 & -1 & -1 \\
1 & -1 & -1 & 1 & -1 & 1 & 1 & -1 & 1 & 1 & 1 & -1 \\
1 & -1 & -1 & -1 & 1 & -1 & 1 & 1 & -1 & 1 & 1 & 1 \\
1 & 1 & -1 & -1 & -1 & 1 & -1 & 1 & 1 & -1 & 1 & 1 \\
1 & 1 & 1 & -1 & -1 & -1 & 1 & -1 & 1 & 1 & -1 & 1 \\
1 & 1 & 1 & 1 & -1 & -1 & -1 & 1 & -1 & 1 & 1 & -1 \\
1 & -1 & 1 & 1 & 1 & -1 & -1 & -1 & 1 & -1 & 1 & 1 \\
1 & 1 & -1 & 1 & 1 & 1 & -1 & -1 & -1 & 1 & -1 & 1
\end{pmatrix} \quad (5)$$

If the first row whose absolute value of a sum is the maximum among the rows and the first column whose absolute value of a sum is the maximum among the columns are excluded, the driving matrix D shown in Equation 6 is obtained.

$$D = \begin{pmatrix} 1 & 1 & -1 & 1 & 1 & 1 & -1 & -1 & -1 & 1 & -1 \\ -1 & 1 & 1 & -1 & 1 & 1 & 1 & -1 & -1 & -1 & 1 \\ 1 & -1 & 1 & 1 & -1 & 1 & 1 & 1 & -1 & -1 & -1 \\ -1 & 1 & -1 & 1 & 1 & -1 & 1 & 1 & 1 & -1 & -1 \\ -1 & -1 & 1 & -1 & 1 & 1 & -1 & 1 & 1 & 1 & -1 \\ -1 & -1 & -1 & 1 & -1 & 1 & 1 & -1 & 1 & 1 & 1 \\ 1 & -1 & -1 & -1 & 1 & -1 & 1 & 1 & -1 & 1 & 1 \\ 1 & 1 & -1 & -1 & -1 & 1 & -1 & 1 & 1 & -1 & 1 \\ 1 & 1 & 1 & -1 & -1 & -1 & 1 & -1 & 1 & 1 & -1 \\ -1 & 1 & 1 & 1 & -1 & -1 & -1 & 1 & -1 & 1 & 1 \\ 1 & -1 & 1 & 1 & 1 & -1 & -1 & -1 & 1 & -1 & 1 \end{pmatrix} \quad (6)$$

An m-th row of the driving matrix D indicates a polarity pattern in the m-th driving. In the driving matrix D, each row indicates a single polarity pattern used to generate a single combined detection signal, and all the rows constitute a group of polarity patterns. The column of the driving matrix D indicates to which driving electrode 210 each polarity constituting the polarity pattern is applied. As can be found by assigning the driving matrix D to Equation 3, each combined detection signal is expressed as a sum of a group of detection signals which are obtained by setting one of positive and negative polarities shown in the polarity pattern for electrostatic capacitances at a group of detection positions 230. An absolute value of a detection signal is the same as an electrostatic capacitance on a driving electrode in which a polarity is set to 1, and thus a polarity thereof is positive. An absolute value of a detection signal is the same as an electrostatic capacitance on a driving electrode in which a polarity is set to −1, and thus a polarity thereof is negative.

As shown in Equation 7, an electrostatic capacitance at each detection position 230 is calculated by using a product between an inverse matrix $D^{-1}$ of the driving matrix D and the combined detection signal matrix A. In the polarity pattern electrodes of the driving matrix D, the number of positive polarities is similar to the number of negative polarities. For example, if N is 7, the number of positive polarities in the respective polarity pattern elements of the driving matrix D is four, and the number of negative polarities is three. If N is 11, the number of positive polarities is six, the number of negative polarities is five, and if N is 13, the number of positive polarities is seven, and the number of negative polarities is six. A sum obtained by adding "1" of a positive polarity and "−1" of a negative polarity together is 1 in any case where N is 7, 11, and 13. In other words, in any polarity pattern, the number of positive polarities is 1 larger than the number of negative polarities. As mentioned above, since the number of positive polarities and the number of negative polarities included in the polarity pattern are similar to each other, a biased polarity (a polarity of a voltage applied between the driving electrode 210 and the detection electrode 220) of a driving signal output from the driving unit 270 is reduced. Thus, radiation noise from the driving electrode 210 and the detection electrode 220 is reduced more than in the related art. Since a biased polarity of a group of detection signals which are sources of the combined detection signal is reduced, a signal level of the combined detection signal is reduced more than in a case where only positive detection signals are included in a group of detection signals or only negative detection signals are included in a group of detection signals.

$$C = D^{-1} \cdot A \quad (7)$$

The inverse matrix $D^{-1}$ includes a fraction as an element, and thus if both sides are multiplied by a number k of the fraction, computation is simplified as shown in Equation 8.

$$kC = kD^{-1} \cdot A \quad (8)$$

For example, if N is 11, each side is multiplied by 6 as in Equation 9. As a result, 6C is obtained by a product between a matrix having only 0 and 1 as elements and A. In other words, a value of an integer multiple of the electrostatic capacitance can be calculated only with a sum of combined detection signals, and thus computation is simplified.

$$6C = 6D^{-1} \cdot A = \begin{pmatrix} 1 & 0 & 1 & 0 & 0 & 0 & 1 & 1 & 1 & 0 & 1 \\ 1 & 1 & 0 & 1 & 0 & 0 & 0 & 1 & 1 & 1 & 0 \\ 0 & 1 & 1 & 0 & 1 & 0 & 0 & 0 & 1 & 1 & 1 \\ 1 & 0 & 1 & 1 & 0 & 1 & 0 & 0 & 0 & 1 & 1 \\ 1 & 1 & 0 & 1 & 1 & 0 & 1 & 0 & 0 & 0 & 1 \\ 1 & 1 & 1 & 0 & 1 & 1 & 0 & 1 & 0 & 0 & 0 \\ 0 & 1 & 1 & 1 & 0 & 1 & 1 & 0 & 1 & 0 & 0 \\ 0 & 0 & 1 & 1 & 1 & 0 & 1 & 1 & 0 & 1 & 0 \\ 0 & 0 & 0 & 1 & 1 & 1 & 0 & 1 & 1 & 0 & 1 \\ 1 & 0 & 0 & 0 & 1 & 1 & 1 & 0 & 1 & 1 & 0 \\ 0 & 1 & 0 & 0 & 0 & 1 & 1 & 1 & 0 & 1 & 1 \end{pmatrix} \cdot A \quad (9)$$

The electrostatic capacitance calculated at this time may be employed as a final electrostatic capacitance. However, the inverse matrix $D^{-1}$ includes 0, and thus a detection signal multiplied by 0 is not used for computation. In encoding driving, if there are a lot of detection signals which are not used for computation, a noise reduction effect is not improved. Therefore, an extended inverse matrix $E^{-1}$ is created by replacing the element of 0 included in $kD^{-1}$ obtained by multiplying the inverse matrix of D by k with −1. For example, if N is 11, the extended inverse matrix $E^{-1}$ is expressed as in Equation 10.

$$E^{-1} = \begin{pmatrix} 1 & -1 & 1 & -1 & -1 & -1 & 1 & 1 & 1 & -1 & 1 \\ 1 & 1 & -1 & 1 & -1 & -1 & -1 & 1 & 1 & 1 & -1 \\ -1 & 1 & 1 & -1 & 1 & -1 & -1 & -1 & 1 & 1 & 1 \\ 1 & -1 & 1 & 1 & -1 & 1 & -1 & -1 & -1 & 1 & 1 \\ 1 & 1 & -1 & 1 & 1 & -1 & 1 & -1 & -1 & -1 & 1 \\ 1 & 1 & 1 & -1 & 1 & 1 & -1 & 1 & -1 & -1 & -1 \\ -1 & 1 & 1 & 1 & -1 & 1 & 1 & -1 & 1 & -1 & -1 \\ -1 & -1 & 1 & 1 & 1 & -1 & 1 & 1 & -1 & 1 & -1 \\ -1 & -1 & -1 & 1 & 1 & 1 & -1 & 1 & 1 & -1 & 1 \\ 1 & -1 & -1 & -1 & 1 & 1 & 1 & -1 & 1 & 1 & -1 \\ -1 & 1 & -1 & -1 & -1 & 1 & 1 & 1 & -1 & 1 & 1 \end{pmatrix} \quad (10)$$

If the extended inverse matrix $E^{-1}$ is used, an intermediate value matrix B of N rows and one column having intermediate values as elements is calculated as in Equation 11. Each element of the intermediate value matrix B indicates an intermediate value of electrostatic capacitance with the same subscript.

$$kB = k \begin{pmatrix} B_1 \\ \vdots \\ B_N \end{pmatrix} = E^{-1} \cdot A \quad (11)$$

Figure 2:
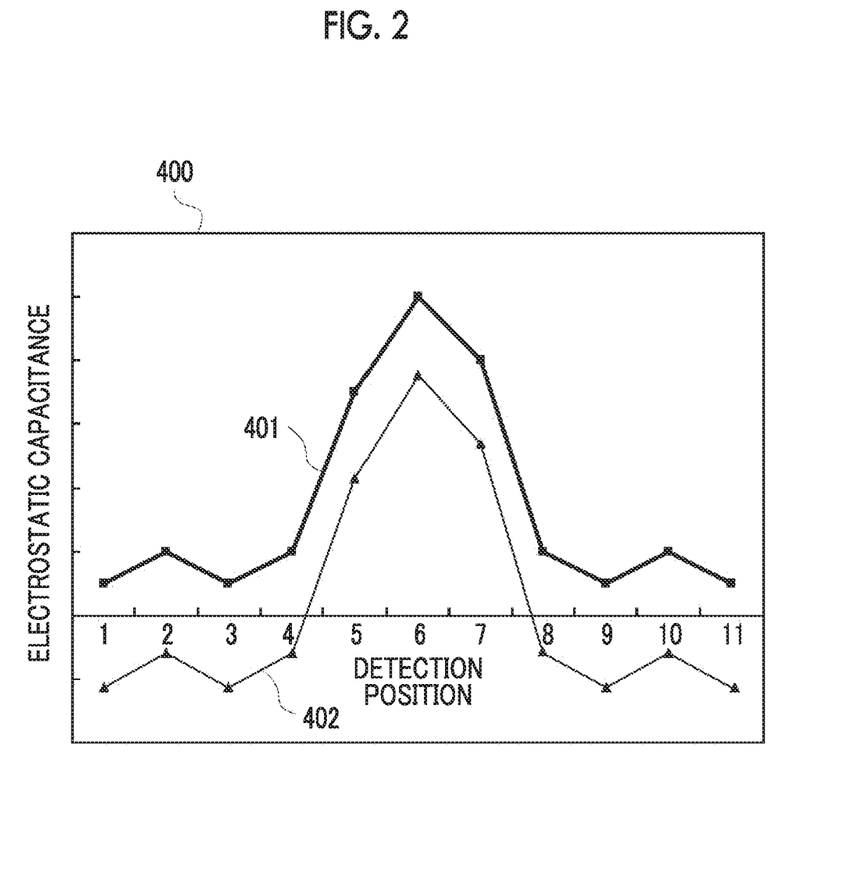
FIG. 2 is a diagram illustrating examples of electrostatic capacitance and intermediate values calculated by the input apparatus illustrated in FIG. 1.

FIG. 2 illustrates an exemplary graph 401 of electrostatic capacitances calculated by using the inverse matrix $D^{-1}$ as in Equation 7 and an exemplary graph 402 of intermediate values calculated by using the extended inverse matrix $E^{-1}$ as in Equation 11 in a case of N=11. A transverse axis expresses a difference between the detection positions 230. On theory, electrostatic capacitance calculated by using the inverse matrix exhibits actual electrostatic capacitance, but includes a lot of noise. On the other hand, an intermediate value calculated by using the extended inverse matrix $E^{-1}$ does not directly exhibit electrostatic capacitance but includes less noise. Here, it is empirically known that, if the graph 402 is moved in the vertical direction, the graph has a shape similar to the graph 401.

Therefore, as in Equation 12, an offset f indicating an average of differences between electrostatic capacitances and intermediate values corresponding to the respective detection positions 230 is obtained.

$$f = \frac{1}{N}\sum_{m=1}^{N}(C_m - B_m) \qquad (12)$$

A corrected electrostatic capacitance matrix Z is calculated by adding the offset f to each element of the intermediate value matrix B as in Equation 13. Adding of the offset f corresponds to the graph 402 illustrated in FIG. 2 coming close to the graph 401 through parallel movement.

$$Z = \begin{pmatrix} Z_1 \\ \vdots \\ Z_N \end{pmatrix} = \begin{pmatrix} B_1 \\ \vdots \\ B_N \end{pmatrix} + \begin{pmatrix} f \\ \vdots \\ f \end{pmatrix} \qquad (13)$$

Each element of the corrected electrostatic capacitance matrix Z indicates a corrected electrostatic capacitance corresponding to an intermediate value with the same subscript. The corrected electrostatic capacitance is close to an actual electrostatic capacitance, and exhibits a less noise value than in a case of using the inverse matrix $D^{-1}$. The intermediate value may be used instead of the electrostatic capacitance.

The driving matrix D in a case of N=7 is expressed as in Equation 14.

$$D = \begin{pmatrix} 1 & 1 & 1 & -1 & 1 & -1 & -1 \\ -1 & 1 & 1 & 1 & -1 & 1 & -1 \\ -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \end{pmatrix} \qquad (14)$$

In a case of N=7, a coefficient k for making an element of the inverse matrix $D^{-1}$ of the driving matrix D 0 or 1 is 4, and a four times inverse matrix $D^{-1}$ is expressed as in Equation 15.

$$4D^{-1} = \begin{pmatrix} 1 & 0 & 0 & 1 & 0 & 1 & 1 \\ 1 & 1 & 0 & 0 & 1 & 0 & 1 \\ 1 & 1 & 1 & 0 & 0 & 1 & 0 \\ 0 & 1 & 1 & 1 & 0 & 0 & 1 \\ 1 & 0 & 1 & 1 & 1 & 0 & 0 \\ 0 & 1 & 0 & 1 & 1 & 1 & 0 \\ 0 & 0 & 1 & 0 & 1 & 1 & 1 \end{pmatrix} \qquad (15)$$

The extended inverse matrix $E^{-1}$ in a case of N=7 is expressed as in Equation 16.

$$E^{-1} = \begin{pmatrix} 1 & -1 & -1 & 1 & -1 & 1 & 1 \\ 1 & 1 & -1 & -1 & 1 & -1 & 1 \\ 1 & 1 & 1 & -1 & -1 & 1 & -1 \\ -1 & 1 & 1 & 1 & -1 & -1 & 1 \\ 1 & -1 & 1 & 1 & 1 & -1 & -1 \\ -1 & 1 & -1 & 1 & 1 & 1 & -1 \\ -1 & -1 & 1 & -1 & 1 & 1 & 1 \end{pmatrix} \qquad (16)$$

The driving matrix D in a case of N=13 is expressed as in Equation 17.

$$D = \qquad (17)$$

$$\begin{pmatrix} 1 & 1 & -1 & 1 & 1 & -1 & -1 & -1 & -1 & 1 & 1 & -1 & 1 \\ 1 & 1 & 1 & -1 & 1 & 1 & -1 & -1 & -1 & -1 & 1 & 1 & -1 \\ -1 & 1 & 1 & 1 & -1 & 1 & 1 & -1 & -1 & -1 & -1 & 1 & 1 \\ 1 & -1 & 1 & 1 & 1 & -1 & 1 & 1 & -1 & -1 & -1 & -1 & 1 \\ 1 & 1 & -1 & 1 & 1 & 1 & -1 & 1 & 1 & -1 & -1 & -1 & -1 \\ -1 & 1 & 1 & -1 & 1 & 1 & 1 & -1 & 1 & 1 & -1 & -1 & -1 \\ -1 & -1 & 1 & 1 & -1 & 1 & 1 & 1 & -1 & 1 & 1 & -1 & -1 \\ -1 & -1 & -1 & 1 & 1 & -1 & 1 & 1 & 1 & -1 & 1 & 1 & -1 \\ -1 & -1 & -1 & -1 & 1 & 1 & -1 & 1 & 1 & 1 & -1 & 1 & 1 \\ 1 & -1 & -1 & -1 & -1 & 1 & 1 & -1 & 1 & 1 & 1 & -1 & 1 \\ 1 & 1 & -1 & -1 & -1 & -1 & 1 & 1 & -1 & 1 & 1 & 1 & -1 \\ -1 & 1 & 1 & -1 & -1 & -1 & -1 & 1 & 1 & -1 & 1 & 1 & 1 \\ 1 & -1 & 1 & 1 & -1 & -1 & -1 & -1 & 1 & 1 & -1 & 1 & 1 \end{pmatrix}$$

In a case of N=13, a coefficient k for making an element of the inverse matrix $D^{-1}$ of the driving matrix D 0 or 1 is 6, and a six times inverse matrix is expressed as in Equation 18.

$$6D^{-1} = \begin{pmatrix} 0 & 1 & 0 & 1 & 1 & 0 & 0 & 0 & 0 & 1 & 1 & 0 & 1 \\ 1 & 0 & 1 & 0 & 1 & 1 & 0 & 0 & 0 & 0 & 1 & 1 & 0 \\ 0 & 1 & 0 & 1 & 0 & 1 & 1 & 0 & 0 & 0 & 0 & 1 & 1 \\ 1 & 0 & 1 & 0 & 1 & 0 & 1 & 1 & 0 & 0 & 0 & 0 & 1 \\ 1 & 1 & 0 & 1 & 0 & 1 & 0 & 1 & 1 & 0 & 0 & 0 & 0 \\ 0 & 1 & 1 & 0 & 1 & 0 & 1 & 0 & 1 & 1 & 0 & 0 & 0 \\ 0 & 0 & 1 & 1 & 0 & 1 & 0 & 1 & 0 & 1 & 1 & 0 & 0 \\ 0 & 0 & 0 & 1 & 1 & 0 & 1 & 0 & 1 & 0 & 1 & 1 & 0 \\ 0 & 0 & 0 & 0 & 1 & 1 & 0 & 1 & 0 & 1 & 0 & 1 & 1 \\ 1 & 0 & 0 & 0 & 0 & 1 & 1 & 0 & 1 & 0 & 1 & 0 & 1 \\ 1 & 1 & 0 & 0 & 0 & 0 & 1 & 1 & 0 & 1 & 0 & 1 & 0 \\ 0 & 1 & 1 & 0 & 0 & 0 & 0 & 1 & 1 & 0 & 1 & 0 & 1 \\ 1 & 0 & 1 & 1 & 0 & 0 & 0 & 0 & 1 & 1 & 0 & 1 & 0 \end{pmatrix} \qquad (18)$$

The extended inverse matrix $E^{-1}$ in a case of N=13 is expressed as in Equation 19.

$$E^{-1} = \begin{pmatrix}
-1 & 1 & -1 & 1 & 1 & -1 & -1 & -1 & -1 & 1 & 1 & -1 & 1 \\
1 & -1 & 1 & -1 & 1 & 1 & -1 & -1 & -1 & -1 & 1 & 1 & -1 \\
-1 & 1 & -1 & 1 & -1 & 1 & 1 & -1 & -1 & -1 & -1 & 1 & 1 \\
1 & -1 & 1 & -1 & 1 & -1 & 1 & 1 & -1 & -1 & -1 & -1 & 1 \\
1 & 1 & -1 & 1 & -1 & 1 & -1 & 1 & 1 & -1 & -1 & -1 & -1 \\
-1 & 1 & 1 & -1 & 1 & -1 & 1 & -1 & 1 & 1 & -1 & -1 & -1 \\
-1 & -1 & 1 & 1 & -1 & 1 & -1 & 1 & -1 & 1 & 1 & -1 & -1 \\
-1 & -1 & -1 & 1 & 1 & -1 & 1 & -1 & 1 & -1 & 1 & 1 & -1 \\
-1 & -1 & -1 & -1 & 1 & 1 & -1 & 1 & -1 & 1 & -1 & 1 & 1 \\
1 & -1 & -1 & -1 & -1 & 1 & 1 & -1 & 1 & -1 & 1 & -1 & 1 \\
1 & 1 & -1 & -1 & -1 & -1 & 1 & 1 & -1 & 1 & -1 & 1 & -1 \\
-1 & 1 & 1 & -1 & -1 & -1 & -1 & 1 & 1 & -1 & 1 & -1 & 1 \\
1 & -1 & 1 & 1 & -1 & -1 & -1 & -1 & 1 & 1 & -1 & 1 & -1
\end{pmatrix} \quad (19)$$

Figure 3:
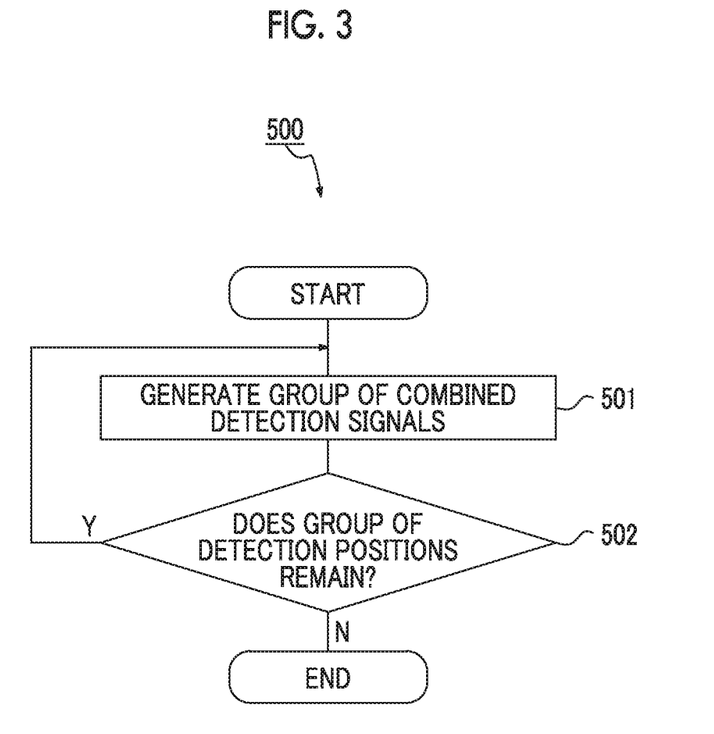
FIG. 3 is a flowchart illustrating an operation of a control unit illustrated in FIG. 1.

Next, a description will be made of a process of generating a combined detection signal under the control of the control unit 310 with reference to a flow 500 illustrated in FIG. 3.

First, in step 501, the control unit 310 controls the sensor section 200 to generate a group of combined detection signals corresponding to one or more groups of detection positions 235 having the same number of detection positions 230.

First, the control unit 310 causes the first detection unit 260a illustrated in FIG. 1 to generate a group of combined detection signals. The number N of detection positions 230 included in the first detection unit 260a is eleven, and thus polarity patterns are determined on the basis of the driving matrix D in a case of N=11 shown in Equation 6. The control unit 310 sequentially transmits the polarity patterns from the polarity pattern indicated by the first row of the driving matrix D shown in Equation 6 to the polarity pattern indicated by the eleventh row thereof, to the driving unit 270. The first column to the eleventh column of the driving matrix D shown in Equation 6 respectively correspond to the first driving electrode 210a to the eleventh driving electrode 210k illustrated in FIG. 1 in this order. The driving unit 270 performs driving once for each polarity pattern, and performs driving for a total of eleven times. The signal reproduction unit 320 stores a combined detection signal corresponding to one time in the storage section 330 whenever driving is performed once, and stores a total of eleven combined detection signals in the storage section 330.

Next, in step 502, in a case where it is determined that a group of detection positions remains at which a group of combined detection signals are not generated, the control unit 310 returns to step 501, and causes a group of combined detection signals to be generated with respect to the remaining group of detection positions. In step 502, in a case where it is determined that a group of detection positions does not remain at which a group of combined detection signals are not generated, the control unit 310 finishes the process.

The control unit 310 causes the first detection unit 260a to generate a group of combined detection signals and then causes the second detection unit 260b to generate a group of combined detection signals. Since the number N of detection positions 230 included in the second detection unit 260b is seven, polarity patterns are determined on the basis of the driving matrix D in a case of N=7 shown in Equation 14. The control unit 310 sequentially transmits the polarity patterns from the polarity pattern indicated by the first row of the driving matrix D shown in Equation 14 to the polarity pattern indicated by the seventh row thereof, to the driving unit 270. The first column to the seventh column of the driving matrix D shown in Equation 14 respectively correspond to the third driving electrode 210c to the ninth driving electrode 210i illustrated in FIG. 1 in this order. The driving unit 270 performs driving once for each polarity pattern, and performs driving for a total of seven times. The signal reproduction unit 320 stores a combined detection signal corresponding to one time in the storage section 330 whenever driving is performed once, and stores a total of seven combined detection signals in the storage section 330.

The number of detection units 260 may be three or larger. A plurality of detection units 260 may have the same number of detection positions 230. The number of detection positions 230 included in a single detection unit 260 may be numbers other than the numbers described in the present embodiment. A group of combined detection signals may be simultaneously generated at a plurality of groups of detection positions 235 having the same number of detection positions 230, and a group of combined detection signals may be generated separately therefrom.

Figure 4:
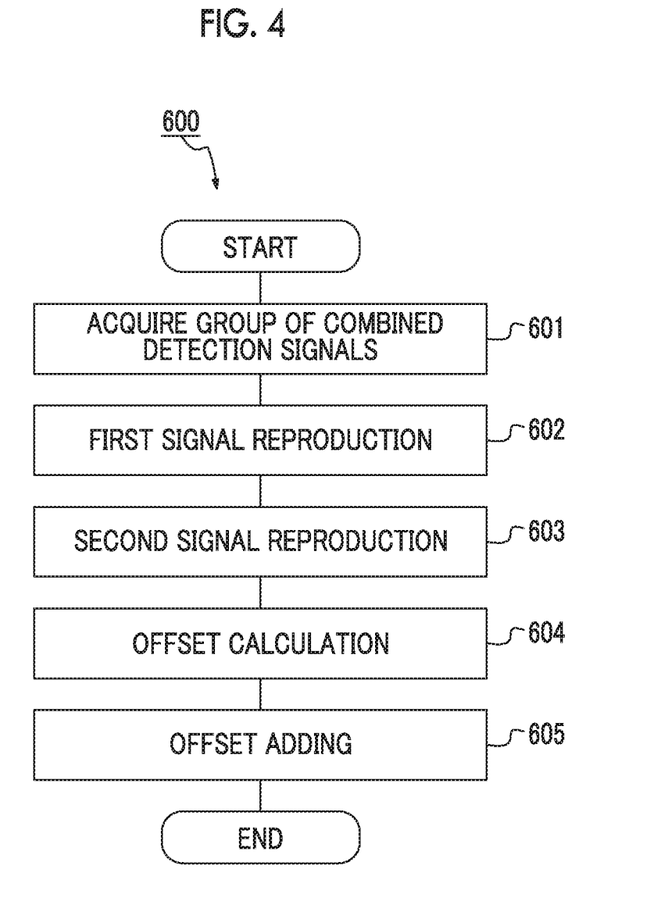
FIG. 4 is a flowchart illustrating an operation of a signal reproduction unit illustrated in FIG. 1.

Next, a description will be made of a signal reproduction process in the signal reproduction unit 320 with reference to a flow 600 illustrated in FIG. 4. The signal reproduction process is performed for each group of detection positions 235. Through the signal reproduction process, an electrostatic capacitance at each detection position 230 included in a single group of detection positions 235 is calculated. In the input apparatus 100 illustrated in FIG. 1, an electrostatic capacitance at each detection position 230 included in the first group of detection positions 235a is calculated on the basis of a group of combined detection signals output from the first combined detection signal generation unit 250a, and an electrostatic capacitance at each detection position 230 included in the second group of detection positions 235b is calculated on the basis of a group of combined detection signals output from the second combined detection signal generation unit 250b. The signal reproduction process may be performed on a plurality of groups of combined detection signals in arbitrary order.

First, the signal reproduction unit 320 acquires a group of generated combined detection signals from the storage section 330 under the control of the control unit 310 in step 601.

Next, in step 602, the signal reproduction unit 320 performs a first signal reproduction process. In the first signal reproduction process, as shown in Equation 7, the electrostatic capacitance matrix C is calculated by using a product between the inverse matrix D−1 of the driving matrix D and the combined detection signal matrix A formed of a stored group of combined detection signals. In calculation of the electrostatic capacitance matrix C, Equation 8 may be used in order to simplify computation. Each element of the electrostatic capacitance matrix C indicates an electrostatic capacitance at each detection position 230 on theory, but includes a lot of noise as described above.

Next, the signal reproduction unit 320 performs a second signal reproduction process in step 603. In the second signal reproduction process, as shown in Equation 11, the intermediate value matrix B is calculated by using a product between the extended inverse matrix E−1 and the combined detection signal matrix A.

Next, in step 604, the signal reproduction unit 320 performs an offset calculation process. In the offset calculation process, as shown in Equation 12, the offset f indicating an average of differences between the electrostatic capacitance matrix C reproduced in the first signal reproduction process and the intermediate value matrix B reproduced in the second signal reproduction process is calculated.

Next, in step 605, the signal reproduction unit 320 performs an offset adding process. In the offset adding process, as shown in Equation 13, the corrected electrostatic capacitance matrix Z is calculated by adding the offset f calculated in the offset calculation process to each element of the intermediate value matrix B reproduced in the second signal reproduction process.

According to the present embodiment, since there are provided a plurality of detection units 260 in which the number of detection positions 230 included in a group of detection positions 235 differs, a detection region in which the detection positions 230 are distributed can be easily made to have arbitrary shapes (a circular shape, a polygonal shape, and the like) other than a rectangular shape, and thus it is possible to improve a degree of freedom of a shape of the detection region.

A group of polarity patterns used for generation of a group of combined detection signals in the detection unit 260 is selected so that the number of positive polarities and the number of negative polarities included in each polarity pattern are similar to each other according to the number of detection positions 230 included in the detection unit 260. Consequently, since a difference between the number of positive detection signals and the number of negative detection signals which are sources of the combined detection signal is reduced in each of the plurality of detection units 260, a signal level of the combined detection signal can be reduced more than in a case where balance of the number of detection signals is biased to one polarity. If the signal level of the combined detection signal is reduced, a sufficient dynamic range for the combined detection signal can be secured in the processing section 300 to which the combined detection signal is input. Therefore, a minute detection signal obtained in each detection element 240 can be reproduced with high sensitivity.

Therefore, it is possible to realize high sensitivity while improving a degree of freedom of a shape of the detection region in which the detection positions 230 are distributed.

Since the number of positive polarities and the number of negative polarities included in a polarity pattern are similar to each other, a biased polarity of a driving signal output from the driving unit 270 is reduced, and thus it is possible to reduce radiation noise from the driving electrode 210 and the detection electrode 220.

The present invention is not limited to the above-described embodiment. In other words, a person skilled in the art may perform various alterations, combinations, sub-combinations, and replacements in relation to the constituent elements of the above-described embodiment within the technical scope of the present invention or the equivalents thereof.

For example, in the above-described embodiment, the electrostatic capacitance type sensor section is used in which pieces of electric charge of a group of detection elements 240 (capacitors) whose electrostatic capacitances change according to a proximity state of an object are combined with each other, and are output as a combined detection signal, but the present invention is not limited to this example. In other words, the present invention is also applicable to an input apparatus including various types of detection elements whose physical quantities change according to a proximity state of an object.

The present invention is applicable to various input apparatuses. The present invention is applicable to, for example, an input apparatus in which a detection region where a detection position is disposed is not rectangular.

It should be understood by those skilled in the art that various modifications, combinations, sub-combinations and alterations may occur depending on design requirements and other factors insofar as they are within the scope of the appended claims of the equivalents thereof.

What is claimed is:

1. An input apparatus for inputting information according to a proximity state of an object at a plurality of detection positions, the apparatus comprising:
    a sensor section including a plurality of detection units each of which detects the proximity state of the object at a group of detection positions, each detection unit generating a combined detection signal by summing a group of detection signals obtained from the group of detection positions, each detection signal having a signal level corresponding to the proximity state detected at the corresponding detection position and a controlled polarity assigned at the corresponding detection position such that the group of detection signals has a polarity pattern formed of a group of controlled polarities;
    a processing section including:
        a control unit which controls the sensor section such that each of the plurality of detection units generates a group of combined detection signals by setting a group of different polarity patterns for the group of the detection signals and summing the group of the detection signals into the combined detection signal pattern by pattern, such that a number of the resulting combined detection signals forming the group thereof is the same as a number of the detection signals forming the group thereof; and
        a signal reproduction unit which reproduces signal levels of the group of detection signals from which the group of combined detection signals are generated in each detection unit, based on the group of combined detection signals generated by the detection unit and the group of the polarity patterns used to generate the group of combined detection signals,
    wherein at least one of the plurality of detection units has a number of the detection positions forming the group thereof different from a number of the detection positions forming the group thereof in another detection unit,
    wherein the control unit selects the group of the polarity patterns for each of the plurality of detection units such that each polarity pattern has approximately the same number of positive polarities and negative polarities therein,
    wherein, in a case where one of the detection units has N detection positions forming the group thereof, and the positive polarity and the negative polarity set to each detection signal are indicated by "1" and "−1", respectively, the polarity pattern set to the group of detection signals having N detection signals is expressed by a partial matrix formed of a single row having N elements of "1" and "−1", and the group of the polarity patterns having N polarity patterns is expressed by an N×N matrix formed of N rows of partial matrices,
    wherein the signal reproduction unit reproduces the signal levels of the group of the detection signals from which the combined detection signal are generated in each detection unit by performing calculation of a product of an inverse matrix of the N×N matrix, and an N×1 matrix formed of a single column having N elements which are N combined detection signals of the group generated by the detection unit, wherein in the control unit, the N×N matrix is generated from a Hadamard matrix having N+1 rows and N+1 columns which is formed using a Bailey method, by excluding a row and a column having elements thereof whose summed value has a greatest absolute value among the rows and the columns, respectively, and wherein the signal reproduction unit includes:
- a first signal reproduction section which reproduces first signal levels of the group of detection signals by calculating a product of the inverse matrix and the N×1 matrix;
- a second signal reproduction section which reproduces second signal levels of the group of detection signals by calculating a product of an extended inverse matrix which is a matrix obtained by replacing "0" in the inverse matrix with a value having the negative polarity and the N×1 matrix;
- an offset calculation section that calculates, as an offset, an average value of differences between the first signal levels and the second signal levels; and
- an offset adding section that adds the offset to each of the second signal levels.

2. The input apparatus according to claim 1, wherein the sensor section further includes:
- a plurality of detection elements corresponding to the plurality of detection positions, each detection element generating the detection signal having the signal level corresponding to the proximity state of the object, and the polarity of the detection signal being set according to an input driving signal; and
- a driving unit which supplies, controlled by the control unit, the driving signal to each of the plurality of detection elements, wherein each of the plurality of detection units includes a group of the detection elements corresponding to the group of the detection positions, the group of the detection elements outputting the group of detection signals.

3. The input apparatus according to claim 2,
wherein the sensor section further includes:
- a plurality of detection electrodes;
- a plurality of driving electrodes intersecting the plurality of detection electrodes, each driving electrode receiving the driving signal from the driving unit; and
- a combined detection signal generation unit, wherein each of the detection elements is a capacitor formed at an intersection between one of the detection electrodes and one of the driving electrodes the group of detection elements being a group of the capacitors formed between one of the detection electrodes and a group of the driving electrodes intersecting the one detection electrode, and wherein the combined detection signal generation unit generates the combined detection signal for each of the plurality of detection electrodes, the group of the detection signals indicating electrostatic capacitances of the group of the capacitors with one of the positive polarity and the negative polarity.

4. The input apparatus according to claim 3,
wherein a number of the driving electrodes intersecting each detection electrode is a prime number.

5. The input apparatus according to claim 1, wherein the number of the detection positions in the group is a prime number.

6. The input apparatus according to claim 1, wherein one of the plurality of detection units detects at a first prime number of the detection positions, and another of the plurality of detection units detects at a second prime number of the detection positions.

7. A method for operating an input apparatus for inputting information according to a proximity state of an object at a plurality of detection positions, the apparatus including a sensor section having a plurality of detection units each configured to detect the proximity state of the object at a group of N detection positions, a value of the number N of at least one of the plurality of detection units is different from a value of the number N of another detection unit, the method comprising the steps of:
- generating, in each detection unit, a group of N detection signals at the group of N detection positions, each of the N detection signals having a signal level corresponding to the proximity state detected at the corresponding detection position and a controlled polarity assigned at the corresponding detection position, such that the group of N detection signals has a polarity pattern formed of a group of N controlled polarities;
- generating a combined detection signal by summing the group of N detection signals;
- controlling the sensor section such that each of the plurality of detection units generates a group of N combined detection signals by setting a group of N different polarity patterns for the group of N detection signals and summing the group of N signals pattern by pattern into the group of N combined detection signals; and
- reproducing signal levels of the group of N detection signals from which the group of N combined detection signal are generated in each detection unit, based on the group of N combined detection signals generated by the detection unit and the group of N polarity patterns used to generate the group of N combined detection signals, wherein, in the step of controlling the sensor section, the group of N polarity patterns set for each of the plurality of detection units is selected such that each polarity pattern has approximately the same number of positive polarities and negative polarities therein, wherein, in a case where the positive polarity and the negative polarity set to each detection signal are indicated by "1" and "−1", respectively, the polarity pattern set to the group of N detection signals is expressed by a partial matrix formed of a single row having N elements of "1" and "−1", and the group of N polarity patterns is expressed by an N×N matrix formed of N rows of partial matrices, the N×N matrix being generated from a Hadamard matrix having N+1 rows and N+1 columns which is formed using a Bailey method, by excluding a row and a column having elements thereof whose summed value has a greatest absolute value among the rows and the columns, respectively, and wherein the signal levels of the group of N detection signals are produced by performing calculation of a product of an inverse matrix of the N×N matrix, and an N×1 matrix formed of a single column having N elements which are N combined detection signals of the group generated by the detection unit, the calculation including:

reproducing first signal levels of the group of detection signals by calculating the product of the inverse matrix and the N×1 matrix;

reproducing second signal levels of the group of detection signals by calculating a product of an extended inverse matrix which is a matrix obtained by replacing "0" in the inverse matrix with a value having the negative polarity and the N×1 matrix;

calculating, as an offset, an average value of differences between the first signal levels and the second signal levels; and adding the offset to each of the second signal levels.

8. The method according to claim 7, wherein the number N is a prime number.

9. The method according to claim 7, wherein a value N1 of the number N in the one detection unit and a value N2 of the number N in another detection unit are prime numbers.

10. A non-transitory computer readable storage medium with an executable program stored therein, wherein the program instructs a microprocessor to perform a method for operating an input apparatus for inputting information according to a proximity state of an object at a plurality of detection positions, the apparatus including a sensor section having a plurality of detection units each configured to detect the proximity state of the object at a group of N detection positions, a value of the number N of at least one of the plurality of detection units is different from a value of the number N of another detection unit, the method comprising the steps of:

generating, in each detection unit, a group of N detection signals at the group of N detection positions, each of the N detection signals having a signal level corresponding to the proximity state detected at the corresponding detection position and a controlled polarity assigned at the corresponding detection position, such that the group of N detection signals has a polarity pattern formed of a group of N controlled polarities;

generating a combined detection signal by summing the group of N detection signals;

controlling the sensor section such that each of the plurality of detection units generates a group of N combined detection signals by setting a group of N different polarity patterns for the group of N detection signals to be summed into the combined detection signal, resulting in the group of N combined detection signals; and reproducing signal levels of the group of N detection signals from which the group of N combined detection signal are generated in each detection unit, based on the group of N combined detection signals generated by the detection unit and the group of N polarity patterns used to generate the group of N combined detection signals, wherein, in the step of controlling the sensor section, the group of N polarity patterns set for each of the plurality of detection units is selected such that each polarity pattern has approximately the same number of positive polarities and negative polarities therein, wherein, in a case where the positive polarity and the negative polarity set to each detection signal are indicated by "1" and "−1", respectively, the polarity pattern set to the group of N detection signals is expressed by a partial matrix formed of a single row having N elements of "1" and "−1", and the group of N polarity patterns is expressed by an N×N matrix formed of N rows of partial matrices, the N×N matrix being generated from a Hadamard matrix having N+1 rows and N+1 columns which is formed using a Bailey method, by excluding a row and a column having elements thereof whose summed value has a greatest absolute value among the rows and the columns, respectively, and wherein the signal levels of the group of N detection signals are produced by performing calculation of a product of an inverse matrix of the N×N matrix, and an N×1 matrix formed of a single column having N elements which are N combined detection signals of the group generated by the detection unit, the calculation including:

reproducing first signal levels of the group of detection signals by calculating the product of the inverse matrix and the N×1 matrix;

reproducing second signal levels of the group of detection signals by calculating a product of an extended inverse matrix which is a matrix obtained by replacing "0" in the inverse matrix with a value having the negative polarity and the N×1 matrix;

calculating, as an offset, an average value of differences between the first signal levels and the second signal levels; and adding the offset to each of the second signal levels.

11. The computer readable storage medium according to claim 10, wherein the number N is a prime number.

12. The computer readable storage medium according to claim 10, wherein a value N1 of the number N in the one detection unit and a value N2 of the number N in another detection unit are prime numbers.

* * * * *